United States Patent [19]

Kakizaki et al.

[11] Patent Number: 4,796,119
[45] Date of Patent: Jan. 3, 1989

[54] CASSETTE LOADING APPARATUS FOR TAPE PLAYER

[75] Inventors: Eiichi Kakizaki; Izumi Emura, both of Kakuda, Japan

[73] Assignee: Alps Electric Co., Ltd., Japan

[21] Appl. No.: 4,980

[22] Filed: Jan. 20, 1987

[30] Foreign Application Priority Data

Mar. 22, 1986 [JP] Japan .................... 61-41997[U]

[51] Int. Cl.$^4$ ............ G11B 5/008; G11B 15/00; G11B 17/00
[52] U.S. Cl. ......................... 360/96.5; 360/93
[58] Field of Search .............. 360/96.5, 90, 93, 96.2, 360/96.3, 96.6; 242/197-201

[56] References Cited

U.S. PATENT DOCUMENTS 4,403,266 9/1983 Kamimura et al. ............ 360/105
4,672,485 6/1987 Takahashi ..................... 360/96.5

FOREIGN PATENT DOCUMENTS 0070956 5/1980 Japan ......................... 360/96.5

Primary Examiner—Stuart N. Hecker
Assistant Examiner—David J. Severin
Attorney, Agent, or Firm—Guy W. Shoup; Paul J. Winters

[57] ABSTRACT

A cassette loading apparatus for a tape player includes a pair of cassette holders for guiding two lateral edge portions of a cassette which are mounted on and vertically movable in a chassis. An ejector member is provided in such a manner as to be able to advance and retract along the direction in which the cassette half is inserted, the ejector member being biased in the direction in which the cassette is pushed out. The apparatus further includes a pair of driving links connected to each other. Each of the driving links has a connecting portion which is connected to the corresponding cassette holder, and biased in the direction in which the cassette holder is lowered relative to the chassis. One of the cassette holders and the corresponding driving link are connected together in such a manner that, when the cassette holder is lowered relative to the chassis, an allowance is provided at the joint between the cassette holder and the driving link. A forced-bias member is connected to the cassette holder which is connected to the corresponding driving link with an allowance, the forced-bias member being biased in the direction in which the cassette holder is lowered relative to the chassis.

4 Claims, 6 Drawing Sheets

CASSETTE LOADING APPARATUS FOR TAPE PLAYER

BACKGROUND OF THE INVENTION

1. Field of the Invention

The present invention relates to a tape player into which a cassette accommodating a tape is loaded. More particularly, the present invention pertains to a cassette loading apparatus designed to guide a cassette onto a chassis and to eject the cassette from the chassis when it is to be unloaded.

2. Description of the Related Art

Prior to the description of the present invention, a conventional cassette loading apparatus for a tape player will be explained below with reference to FIGS. 8 to 11. This prior art is disclosed, e.g., in the specification of Japanese Utility Model Laid-Open No. 3539/1986.

In the drawings, the reference numeral 1 denotes cassette holders. As shown in FIG. 11, a pair of cassette holders 1 are respectively provided on the opposing inner surfaces of side plates 2a of a chassis 2. Guide grooves 1a for retaining the lateral edge portions of a cassette 10 are respectively formed in the opposing inner side surfaces of the cassette holders 1. As shown in FIG. 8, a guide pin 3 and a connecting pin 4 are provided on the outer side surface of each cassette holder 1. The pins 3 and 4 are vertically movably guided by slots which are formed in each of the side plates 2a of the chassis 2 in such a manner that the slots extend vertically. When no cassette 10 is loaded, the cassette holders 1 are in a raised position as shown in FIG. 8.

Referring to FIG. 10, a pair of ejector links 5 and 6 are provided on the chassis 2. One ejector link 5 is pivotally supported by a pin 7, and the other ejector link 6 is pivotally supported by a pin 8. The ejector links 5 and 6 are operatively connected together by a connecting pin 9. The ejector link 5 is biased counterclockwise as viewed in FIG. 10 by means of a spring 11. When no cassette half 10 is loaded, the ejector link 5 is pivoted counterclockwise, while the ejector link 6 is pivoted clockwise, and pressing portions 5a and 6a provided at the respective distal ends of the ejector links 5 and 6 extend above the chassis 2 as shown by the one-dot chain line in FIG. 10.

When the cassette 10 is loaded, it is pushed into the cassette accommodating space defined by the chassis 2 in such a manner that both lateral edge portions of the cassette 10 are respectively guided by the guide grooves 1a of the cassette holders 1 which are in the raised position shown in FIG. 8. The ejector links 5 and 6, which are in the position shown by the one-dot chain line in FIG. 10, are pushed by the distal end surface of the cassette 10 and contracted to the position shown by the solid line in FIG. 10. In response to the contracting movement of the ejector links 5 and 6, a driving piece 6b provided at the distal end of the ejector link 6 moves from the position (A) to the position (B) shown in FIG. 10. Since the driving piece 6b is connected to a lock lever 12 provided on the outer side of the side plate 2a of the chassis 2 as shown in FIG. 8, when the driving piece 6b moves from the position (A) to the position (B), the lock lever 12 moves rightward from the position shown in FIG. 8 together with the driving piece 6b to reach the position shown in FIG. 9. A driving link 14 is pivotally supported through a pivot pin 13 on the outer side of the side plate 2a of the chassis 2, so that, when the lock lever 12 moves rightward from the position shown in FIG. 8, a retaining portion 12a provided at the lower end of the lock lever 12 disengages from the distal end of a projecting piece 14a of the driving link 14. In consequence, the driving link 14 is pivoted clockwise by means of the biasing force from a spring 15 to reach the position shown in FIG. 9. A slot 14b provided in the distal end portion of the driving link 14 is retained by the connecting pin 4, so that, when the driving link 14 is pivoted clockwise, the cassette holders 1 are lowered onto the chassis 2 through the connecting pin 4 as shown in FIG. 9, and the cassette 10 is thereby loaded in a state wherein it is in contact with positioning pins 16 projecting from the surface of the chassis 2 (see FIG. 11).

To eject the cassette 10, an unlocking lever 17 is moved rightward as viewed in FIG. 9. An unlocking piece 17a of the unlocking lever 17 causes the driving link 14 to pivot counterclockwise from the position shown in FIG. 9. In consequence, the cassette holders 1 are raised, and the cassette 10 is thereby lifted from the surface of the chassis 2. Since the lock lever 12 is biased in the direction of the arrow A together with the driving piece 6b of the ejector lever 6 by means of the biasing force from the spring 11, when the driving link 14 is pivoted counterclockwise by the action of the unlocking lever 17, the projecting piece 14a is locked by the retaining portion 12a of the lock lever 12 again as shown in FIG. 8. Each of the ejector levers 5 and 6 extends to reach the position shown by the one-dot chain line in FIG. 10, and the cassette 10 is pushed out from the cassette accommodating space by the pressing portions 5a and 6a.

This type of conventional tape loading apparatus suffers, however, from the following problems.

The conventional tape loading apparatus has a pair of driving links 14 which are respectively provided on the outer sides of the side plates 2a of the chassis 2 and which are connected to each other by a connecting member 18. Accordingly, the pair of driving links 14 are activated together in one unit, and the cassette holders 1 which are provided at the right and left sides, respectively, on the chassis 2, are also activated to move together in one unit.

In order that the cassette 10 is appropriately or normally loaded on the positioning pins 16 projecting from the surface of the chassis 2, both lateral edge portions of the cassette 10 must reliably and effectively be held down by the pair of cassette holders 1. However, in the conventional structure, since the right and left driving links 14 are connected together in one unit, it is necessary to adjust the relative positions of the driving links 14 in order to enable the lateral edge portions of the cassette half 10 to be reliably and effectively held down by the two cassette holders 1. For this reason, the connecting member 18 and one driving link 14 are connected together by means of a screw 19, and the relative positions of the right and left driving links 14 are adjusted by adjusting the position of the screw 19 so that the two driving links 14 evenly lower the right and left cassette holders 1.

If tee adjustment by the screw 19 is erroneously effected so that the respective lowered positions of the two cassette holders 1 are not coincident with each other, the respective lowered positions of the lateral edge portions of the cassette 10 ar vertically offset from each other, which means that the cassette 10 is not normally loaded on the positioning pins 16.

Thus, the conventional structure needs the adjustment of the positions of the right and left driving links 14, and this considerably complicates the assembling operation, disadvantageously.

Even when the positions of the right and left driving links 14 are set optically by the adjusting operation, if cassette 10 has warpage or variations in flatness, it is impossible to reliably lower the cassette 10 onto the chassis 2 by means of the right and left cassette holders 1 which are lowered uniformly in one unit. In such case also, an undesirable gap is generated between the cassette 10 and the positioning pins 16, thus making it impossible to load the cassette 10 in a normal state.

SUMMARY OF THE INVENTION

In view of the above-described circumstances, it is a primary object of the present invention to provide a cassette loading apparatus for a tape player which is so designed that a pair of right and left driving links are allowed to be biased independently of each other, thereby enabling two lateral edge portions of a cassette to be reliably held down on a chassis by means of respective biasing forces, and thus allowing the cassette to be infallibly loaded in a normal state.

To this end, the present invention provides a cassette loading apparatus for a tape player, comprising: a pair of cassette holders which are mounted on and vertically movable in a chassis for guiding two lateral edge portions of a cassette; an ejector member provided in such a manner as to be able to advance and retract along the direction in which the cassette is inserted, the ejector member being biased in the direction in which the cassette is pushed out; a pair of driving links connected to each other, each of the driving links having a connecting portion which is connected to the corresponding cassette holder, and biased in the direction in which the cassette holder is lowered relative to the chassis, one of the cassette holders and the corresponding driving link being connected together in such a manner that, when the cassette holder is lowered relative to the chassis, an allowance is provided at the joint between the cassette holder and the driving link; a lock member connected to the ejector member and activated in response to the advancing and retracting movement of the ejector member, the lock member having a retaining portion adapted to retain the driving links in a cassette holder raising position when the ejector member is extended in the direction in which the cassette is pushed out; an unlocking member for releasing the driving links from the retained state; and a forced-bias member connected to the cassette holder which is connected to the corresponding driving link with an allowance, the forced-bias member being biased in the direction in which the cassette holder is lowered relative to the chassis.

According to the present invention, when the cassette holders are lowered onto the chassis by the action of the driving links, one of the cassette holders is pushed down by the forced-bias member within the allowance provided at the joint between the cassette holder and the corresponding driving link. In consequence. the pair of cassette holders are lowered onto the chassis by respective biasing forces which are independent of each other, thus allowing a cassette to be reliably loaded at a predetermined position on the chassis.

The above and other objects, features and advantages of the present invention will become more apparent from the following description of the preferred embodiment thereof, taken in conjunction with the accompanying drawings.

BRIEF DESCRIPTION OF THE DRAWINGS

FIGS. 1 to 7 show in combination one embodiment of the present invention, in which:

FIG. 1 is an exploded perspective view showing the general arrangement of the cassette loading apparatus for a tape player according to the present invention;

FIG. 2 is an exploded perspective view showing the arrangement outside the left-hand side plate of the chassis shown in FIG. 1;

FIGS. 3 and 4 are side views showing the structure of the outside of the left-hand side plate of the chassis in two operative states, respectively;

FIG. 5 is a fragmentary enlarged view of a portion of the arrangement illustrated in FIG. 4, which shows the allowance provided at the joint between one cassette holder and the associated driving link;

FIG. 6 is a plan view of the ejector members as viewed from the upper side of the chassis, which shows the operation of the ejector members; and FIG. 7 is a front view of a cassette in a retained state as viewed in the direction in which it is inserted into the cassette insertion port.

DESCRIPTION OF THE PREFERRED EMBODIMENTS

One preferred embodiment of the present invention will be described hereinunder with reference to FIGS. 1 to 7.

Figure 1:
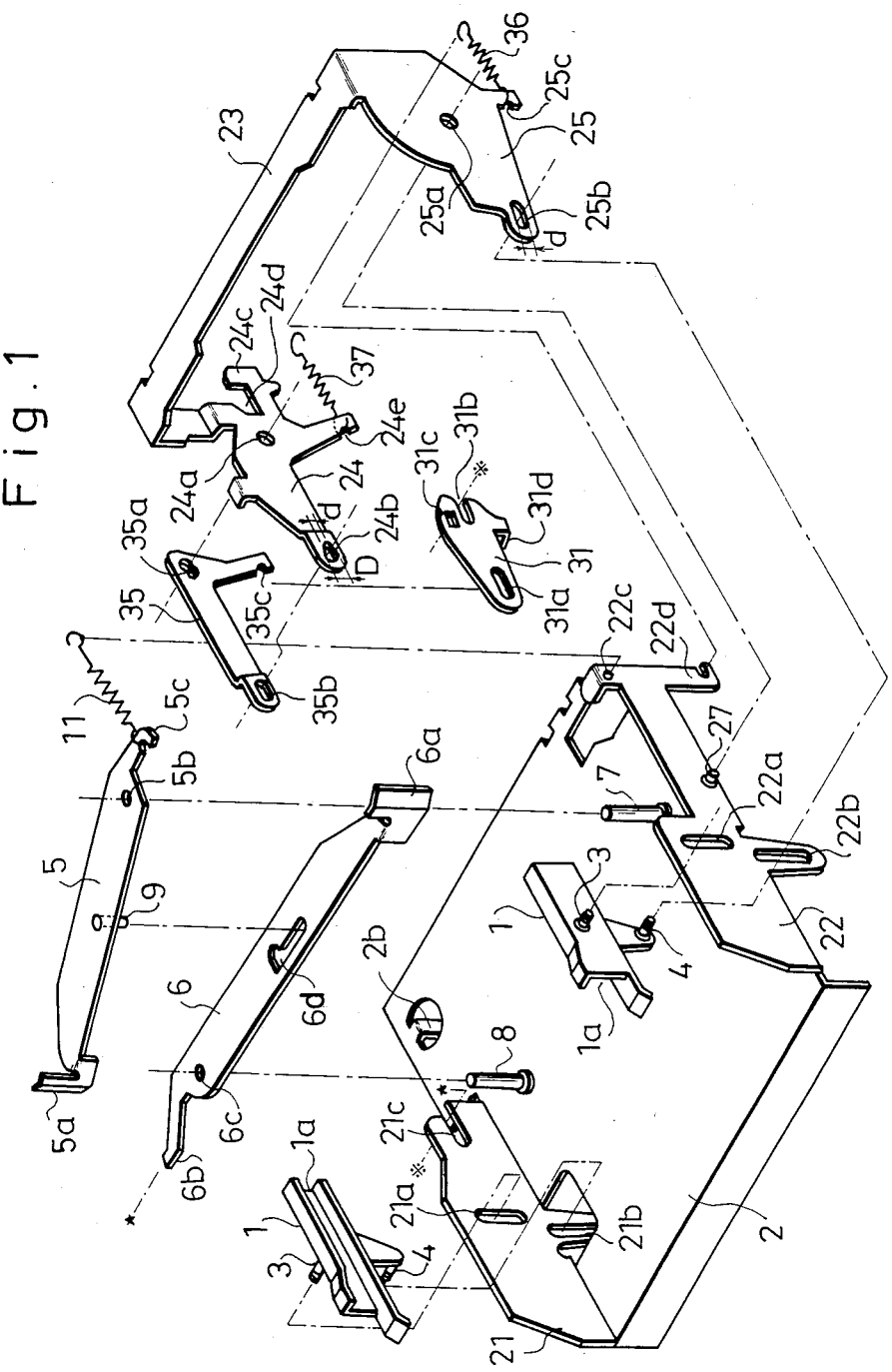
Figure 2:
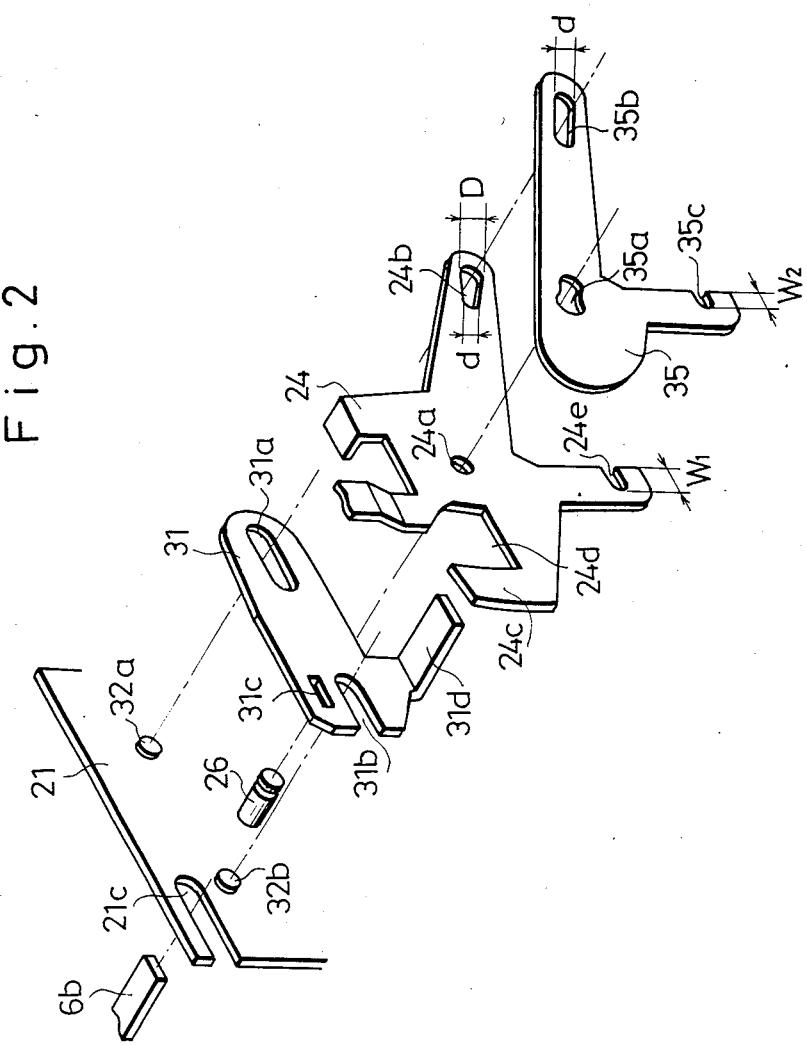
Figure 3:
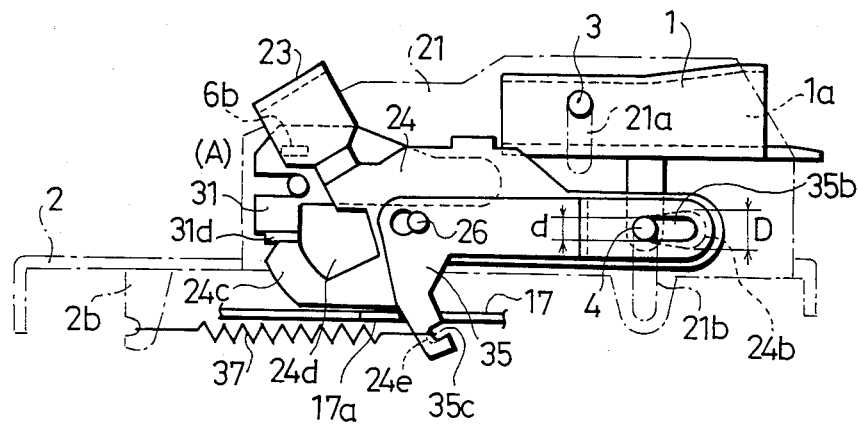
Figure 4:
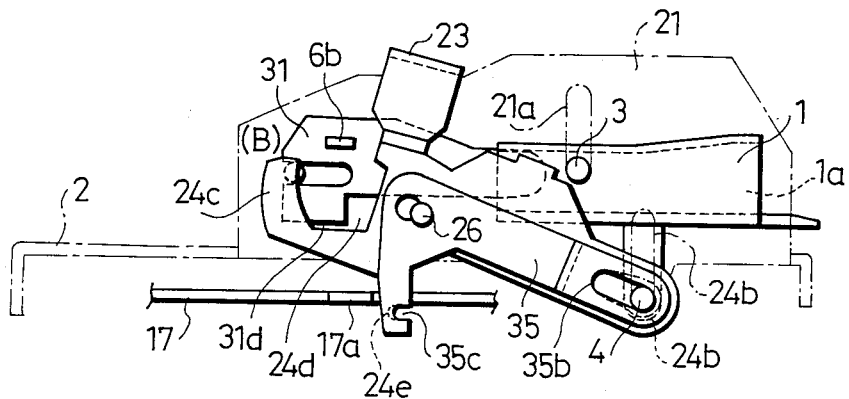
Figure 5:
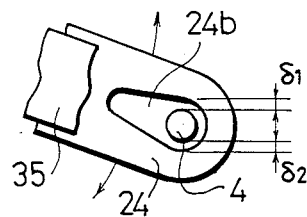
Figure 6:
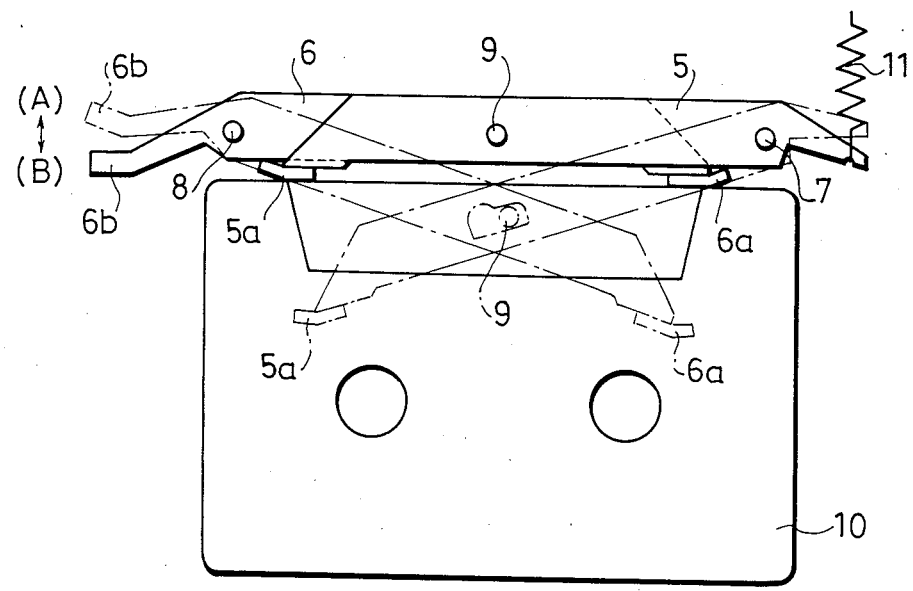
Figure 7:
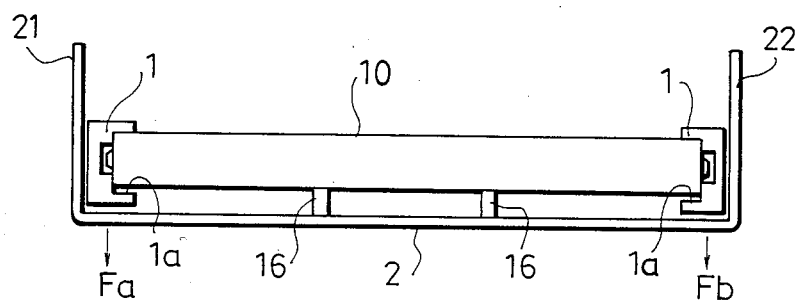

FIG. 1 is an exploded perspective view of one embodiment of the cassette loading apparatus for a tape player according to the present invention; FIG. 2 is an exploded perspective view showing the arrangement outside the left-hand side plate of the chassis shown in FIG. 1; FIGS. 3 and 4 are side views showing the structure of the outside of the left-hand side plate of the chassis in two operative states, respectively; FIG. 5 is a fragmentary enlarged view of a portion of the arrangement illustrated in FIG. 4; FIG. 6 is a plan view of the ejector members as viewed from the upper side of the chassis, which shows the operation of the ejector members; and FIG. 7 is a front view of a cassette in a retained state as viewed in the direction in which it is inserted into the cassette insertion port.

Referring to FIG. 1, the reference numeral 2 denotes a chassis on which are disposed members required for a tape player, such as a pair of reel tables, a capstan and a magnetic head (which are not shown).

Two lateral edge portions of the chassis 2 are bent so as to extend vertically, thereby defining side plates 21 and 22. One side plate 21 is provided with slots 21a and 21b which extend vertically, and the other side plate 22 is also provided with slots 22a and 22b which similarly extend vertically. A pair of cassette holders 1 are respectively disposed on the inner sides of the side plates 21 and 22 in such a manner that the cassette holders 1 are in symmetry with each other with respect to the central axis of the chassis 2. Guide grooves 1a are respectively formed in the respective opposing inner surfaces of the cassette holders 1. The width of each guide groove 1a is so set that the corresponding lateral edge portion of a cassette 10 is able to slide along the groove 1a. A guide pin 3 and a connecting pin 4 are rigidly secured to the outer surface of each cassette holder 1. The cassette holder 1 which is provided on the side plate 21 has its guide pin 3 inserted in the slot 21a and its connecting pin 4 inserted in the slot 21b, whereby the the cassette holder 1 is supported by the chassis 2 so as to be movable in the vertical direction. Similarly, the cassette holder 1 which is provided on the side plate 22 has its guide pin 3 and connecting pin 4 inserted in the slots 22a and 22b, respectively, whereby the cassette holder 1 is supported by the chassis 2 so as to be movable in the vertical direction.

A pair of support pins 7 and 8 are provided on the chassis 2. An ejector lever 5 is fitted on one support pin 7 through a bore 5b so that the lever 55 is pivotally supported. Another ejector lever 6 is fitted on the other support pin 8 through a bore 6c so that the lever 6 is pivotally supported. The ejector lever 6 is disposed underneath the ejector lever 5, and a connecting pin 9 which is provided on the ejector lever 5 is received in a slot 6d provided in the ejector lever 6. The ejector levers 5 and 6 are adapted to extend in the shape of an X as shown by the one-dot chain line in FIG. 6, and the slot 6d has a shape which enables absorption of any possible positional error between the ejector lever 6 and the connecting pin 9 during the expansion and contraction of the ejector levers 5 and 6. The respective distal end portions of the ejector levers 5 and 6 are bent to define pressing portions 5a and 6a. A hook 5c is formed at the distal end of the ejector lever 5, and a spring 11 is stretched between the hook 5c and a small bore 22c provided in the chassis side plate 22. The ejector levers 5 and 6 are biased by means of the force from the spring 11 in the direction in which they are brought into an extended state shown by the one-dot chain line in FIG. 6. The distal end portion of the ejector lever 6 defines a driving piece 6b which projects outward through a groove 21c provided in the chassis side plate 21.

A lock lever 31 is provided on the outer surface of the left-hand side plate 21 of the chassis 2. As shown in FIG. 2, the lock lever 31 is provided with a slot 31a and a notch 31b which extend horizontally. A pair of short guide pins 32a and 32b are provided on the outer surface of the side plate 21, and the lock lever 31 is horizontally slidably supported by the side plate 21 through engagement beteeen the slot 31a and notch 31b and the guide pins 32a and 32b. The lock lever 31 is provided with a fitting groove 31c which receives the driving piece 6b of the ejector lever 6 which projects from the groove 21c provided in the side plate 21. Accordingly, as shown in FIG. 6, the lock lever 31 is activated to move from the position (A) shown in FIG. 3 to the position (B) shown in FIG. 4 in response to the movement of the driving piece 6b of the ejector lever 6 from the position (A) to the position (B). The lower end portion of the lock lever 31 is bent outward to define a retaining portion 31d.

The reference numerals 24 and 25 denote driving links, respectively. The driving links 24 and 25 are connected together by a connecting plate 23. The driving links 24, 25 and the connecting plate 23 are formed by bending a single plate material. Supporting bores 24a and 25a are respectively provided in the driving links 24 and 25. A pivot pin 26 (see FIG. 2) is rigidly secured to the outer surface of the left-hand side plate 21 of the chassis 2, and a pivot pin 27 (see FIG. 1) is rigidly secured to the outer surface of the right-hand side plate 22 of the chassis 2. Thus, the driving links 24 and 25 are supported by the pins 26 and 27 through the bores 24a and 25a, respectively, so that the driving links 24 and 25 pivot in one unit together with the connecting plate 23.

The left-hand side driving link 24 is provided with a projecting piece 24c extending upward and a recess 24d positioned to the side of the projecting piece 24c. The retaining portion 31d of the lock lever 31 is located at such a position that it is engageable with either the projecting piece 24c or the recess 24d (see FIG. 2).

The driving link 24 has a connecting bore 24b provided in its distal end portion, and the driving link 25 similarly has a connecting bore 25b provided in its distal end portion. The connecting pin 4 provided on the left-hand side cassette holder 1 projects outward from the slot 21b in the side plate 21 as described above, and the distal end portoon of the pin 4 is received in the connecting bore 24b provided in the driving link 24. Similarly, the connecting pin 4 provided on the right-hand side cassette holder 1 projects outward from the slot 22b in the side plate 22, and the distal end portion of the pin 4 is received in the connecting bore 25b provided in the driving link 25. More specifically, when the driving links 24 and 25 pivot about the pins 26 and 27, respectively, the corresponding cassette holders 1 are vertically moved in response to the pivotal movement of the links 24 and 25.

The connecting bores 24b and 25b in the driving links 24 and 25 have configurations different from each other. As shown in FIG. 1, the connecting bore 25b in the right-hand side driving link 25 is defined by a slot whose width d is constant throughout it in the longitudinal direction thereof. The width d is set so as to be substantially the same as the diameter of the connecting pin 4 of the cassette holder 1, so that the pin 4 is received in the connecting bore 25b in such a manner as to be slidable in the longitudinal direction of the bore 25b with substantially no play in the widthwise direction of the bore 25b. On the other hand, the connecting bore 24b in the left-hand side driving link 24 is defined by a slot whose width varies in the longitudinal direction thereof. As shown in FIGS. 1 and 3, the connecting bore 24b has such an oval shape that the width of a portion thereof which is closer to the proximal end of the link 24 is relatively small as shown by the reference symbol d and the width of a portion thereof which is closer to the distal end of the link 24 is relatively large as shown by the referene symbol D. The width d is set so as to be substantially the same as the diameter of the connecting pin 4 of the cassette holder 1, while the width D is set so as to be greater than the diameter of the pin 4. Since the connecting bores 24b and 25b in the left and right driving links 24 and 25 have different configurations, the left and right cassette holders 1 are not necessarily moved together in one unit. More specifically, the right-hand side cassette holder 1 is activated through the connecting bore 25b having a uniform width d, and the corresponding cassette holder 1 is therefore vertically moved together with the driving link 25 in response to the pivotal motion of the link 25. On the other hand, the relationship between the left-hand side cassette holder 1 and the driving link 24 is such that, as shown in FIG. 3, they are engaged with each other in one unit only when the connecting pin 4 is fitted in the proximal end portion (the width d) of the connecting bore 24b. However, when the driving link 24 pivots clockwise so that the connecting pin 4 is moved to the distal end portion (the width D) of the connecting bore 24b, the pin 4 has allowances $\delta_1$ and $\delta_2$ (see FIG. 5) with respect to the connecting bore 24b in the vertical direction. More specifically, when the cassette holders 1 are lowered, only the right-hand side cassette holder 1 is lowered together with the driving link 25 in one unit, while the left-hand side cassette holder 1 i lowered with the allowances $\delta_1$ and $\delta_2$ shown in FIG. 5 with respect to the driving link 24. As a result, when the left and right cassette holders 1 are lowered, they are allowed to be independent of each other by an amount corresponding to the allowances $\delta_1$ and $\delta_2$.

Further, a forced-bias link 35 is provided on the outside of the left-hand side driving link 24. The link 35 is supported by the side plate 21 through its supporting bore 35a which is engaged with the pin 26 provided on the outer surface of the side plate 21 (see FIG. 2). The forced-bias link 35 and the driving link 24 are adapted to independently pivot about the pin 26 as the mutual pivot point. A slot 35b is provided in the distal end portion of the forced-bias link 35. The connecting pin 4 of the left-hand side cassette holder 1 is received in both the oval connecting bore 24b provided in the driving link 24 and the slot 35b in the forced-bias link 35. As shown in FIG. 2, the width d of the slot 35b in the link 35 is constant throughout the slot 35b in the longitudinal direction thereof, so that the connecting pin 4 is received in the slot 35b in such a manner as to be slidable only in the longitudinal direction of the slot 35b without any play in the widthwise direction of the slot 35b.

As shown in FIG. 1, a hook groove 25c is formed in the lower end portion of the right-hand side driving link 25, and a spring 36 is stretched between the hook groove 25c and a hook 22d which is provided at the lower end of the side plate 22. The driving link 25 is biased counterclockwise by the spring 36 through the pivot pin 27.

As shown in FIG. 2, a hook groove 24e is formed in the lower end portion of the left-hand side driving link 24, and a hook groove 35c is formed in the lower end portion of the forced-bias link 35. The hook grooves 24e and 35c are provided at substantially the same positions as each other relative to the pin 26. One end of a spring 37 is retained by the hook grooves 24e and 35c, and the other end of the spring 37 is retained by a hook 2b provided on the undersurface of the chassis 2 (see FIG. 3). As shown in FIG. 2, the depth $W_1$ of the hook groove 24e is made greater than the depth $W_2$ of the hook groove 35c. Accordingly, the resilient force of the spring 37 is allowed to act on the forced-bas link 35 stronger than on the driving link 24.

In addition, an unlocking lever 17 is slidably provided on the lower side of the chassis 2 as shown in FIG. 4. An unlocking piece 17a projects from the unlocking lever 17 in such a manner as to face the respective side portions of the lower ends of the driving link 24 and the forced-bias link 34.

The following is a description of the operation of loading and ejecting the cassette 10.

When no cassette 10 is loaded, the pressing portions 5a and 6a of the ejector levers 5 and 6 extend in the direction counter to the direction in which the cassette half 10 is inserted, as shown by the one-dot chain line in FIG. 6. The driving piece 6b of the ejector lever 6 is in the position (A) shown in FIG. 6. Accordingly, the lock lever 31 which is connected to the driving piece 6b is in the position shown in FIG. 3. In this state, the projecting piece 24c provided on the left-hand side driving link 24 is in contact with the retaining portion 31d of the lock lever 31, and the driving link 24 is therefore at rest at the extremity of its counterclockwise pivotal movement. The right-hand side driving link 25 is also in a position where it has been pivoted in the same direction as the left-hand side driving link 24. The pair of cassette holders 1 are in a raised position relative to the chassis 2 through the connectnng pins 4 raised by means of the connecting bores 24b and 25b which are respectively provided in the distal end portions of the driving links 24 and 25. The forced-bias link 35 is also in a position where it has been pivoted counterclockwise following the driving link 24 as shown in FIG. 3. In the state shown in FIG. 3, the connecting pin 4 is fitted in the proximal end portion (the width d) of the connecting bore 24b in the driving link 24, and the raised cassette holder 1 and the driving link 24 are therefore connected together without any play in the widthwise direction of the bore 24b. The right-hand side driving link 25 and the connecting bore 25b (the width d) are also connected together without any play in the widthwise direction of the bore 25b, so that the raised pair of cassette holders 1 are interlocked with each other in one unit.

When, in this state, the cassette 10 is forced into the cassette accommodating space in such a manner that two lateral edge portions of the cassette half 10 are respectively inserted into the guide grooves 1a provided in the cassette holders 1, the pressing portions 5a and 6a of the ejector levers 5 and 6 are pushed by the leading end surface of the cassette 10 in the direction in which the ejector levers 5 and 6 are contacted. When the contracted ejector levers 5 and 6 reach the position shown by the solid line in FIG. 6, the driving piece 6b of the ejector lever 6 moves to the position (B). As the driving piece 6b moves from the position (A) to the position (B), the lock lever 31 connected to the driving-ppiece 6b is moved rightward from the position shown in FIG. 3 to reach the position shown in FIG. 4. During this movement, the retaining portion 31d of the lock lever 31 disengages from the projecting piece 24c of the driving link 24 to unlock the driving link 24. At the moment the driving link 24 is unlocked, the link 24, together with the forced-bias link 35, is pivoted clockwise by means of the resilient force from the spring 37. Simultaneously, the right-hand side driving link 25 is also pivoted by means of the resilient force from the spring 36. The retaining portion 31d enters the recess 24d provided in the driving link 24 as shown in FIG. 4.

As the driving links 24 and 25 are pivoted, the right-hand side cassette holder 1 is first lowered onto the chassis 2 through the connecting pin 4 fitted in the connecting bore 25b provided in the driving link 25. In addition, as the driving link 24 and the forced-bias link 35 are pivoted, the left-hand side cassette holder 1 is also lowered onto the chassis 2 through the connecting pin 4 which is engaged with both the connecting bore 24b in the driving lin 24 and the slot 35b in the forced-bias link 35. As shown in FIG. 5, as the driving link 24 is pivoted clockwise, the connecting pin 4 advances toward the distal end portion (the width D) of the connecting bore 24b. Since the width D of the distal end portion of the connecting bore 24b is greater than the diameter of the connecting pin 4, allowances denoted by $\delta_1$ and $\delta_2$ are provided between the connecting pin 4 and the inner peripheral surface of the connecting bore 24b. However, the slot 35b in the forced-bias link 35 receives the connecting pin 4 without any play in the widthwise direction of the slot 35b, and further the hook groove 35c in the forced-bias link 35 has a smaller depth than that of the hook groove 24e in the driving link 24. Consequently, in the state shown in FIG. 4, the resilient force from the spring 37 acts on the connecting pin 4 through the forced-bias link 35.

More specifically, when the cassette holders 1 are lowered, the left-hand side cassette holder 1 is held downward by means of the force from the spring 37, and the right-hand side cassette holder 1 is held downward by means of the force from the spring 36. Accordingly, the cassette 10 which is retained by the two cassette holders 1 is biased at its two lateral edge portions by the forces of the springs 36 and 37, respectively, and the lateral edge portions of the cassette 10 are held down on the chassis 2 by means of independent forces Fa and Fb, respectively, as shown in FIG. 7. Therefore, the cassette 10 is reliably held down by the forces Fa and Fb and reliably brought into close contact with the upper end faces of the positioning pins 16 projecting from the bottom surface of the chassis 2.

Even when a warped cassette half 10 is loaded, since the lateral edge portions of the cassette 10 are held down by the independent forces Fa and Fb, respectively, the cassette 10 is advantageously loaded on the positioning pins 16 without any problem such as an undesirable gap generated between the cassette 10 and the positioning pins 16.

To eject the cassette 10, the unlocking lever 17 is moved rightward as viewed in FIG. 4. In consequence, the unlocking piece 17a provided on the unlocking lever 17 abuts against the respective side portions of the driving link 24 and the forced-bias link 35, causing both of them to pivot counterclockwise. Since the lock lever 31 is subjected to the force from the spring 11 which biases the ejector lever 6 so that the the lock levrr 31 is biased leftward as viewed in FIG. 4, when the driving link 24 is pivoted counterclockwise to reach the position shown in FIG. 3, the lock lever 31 is moved to the position where the retaining portion 31d abuts against the upper or distal end of the projecting piece 24c. Thus, the driving link 24 is locked in the position shown in FIG. 3. In response to the pivotal movement of the driving link 24 and the driving link 25 connected thereto, the cassette holders 1 are raised, and the cassette 10 is thereby lifted from the bottom surface of the chassis 2. While the lock lever 31 is moved to the position shown in FIG. 3, the ejector levers 5 and 6 are extended to reach the position shown by the one-dot chain line in FIG. 6 by means of the force from the spring 11, and the pressing portions 5a and 6a push out the cassette 10 toward the cassette insertion port.

It should be noted that, although in the illustrated embodiment both the connecting bore 24b in the driving link 24 and the slot 35b in the forced-bias link 35 are engaged with the connecting pin 4, this arrangement is not necessarily limitative, and the present invention may be carried out in another embodiment wherein the cassette holder 1 is provided with a pin in addition to the connecting pin 4, and the slot 35b in the forced-bias link 35 is engaged with this additionaly provided pin.

Figure 8:
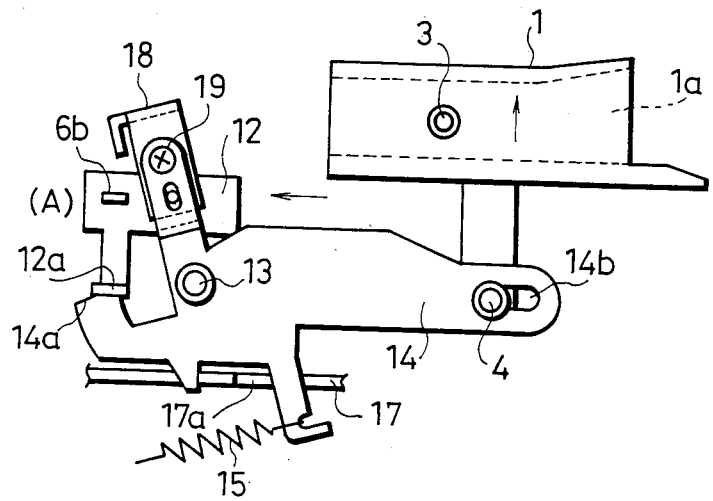
FIGS. 8 and 9 are side views of a conventional cassette loading apparatus as viewed from the left-hand side of the chassis.
Figure 9:
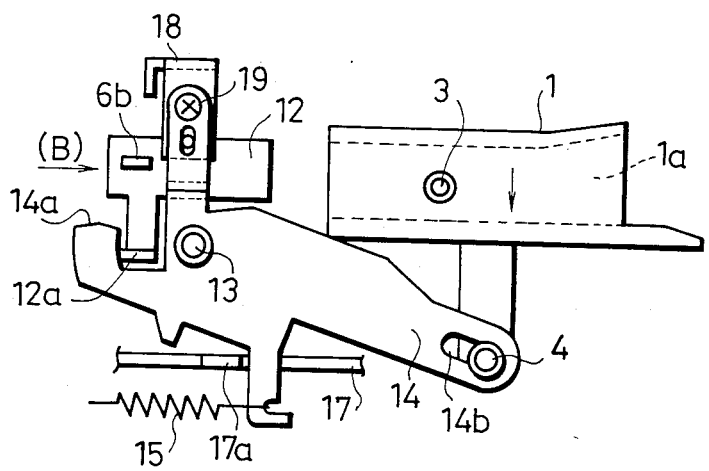
Figure 10:
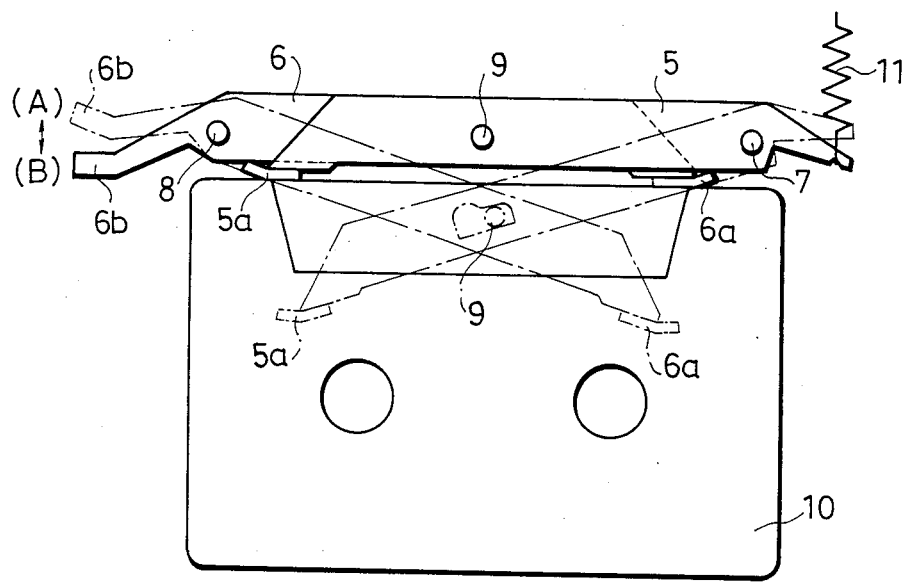
FIG. 10 is a plan view showing ejector members of the conventional cassette loading apparatus.
Figure 11:
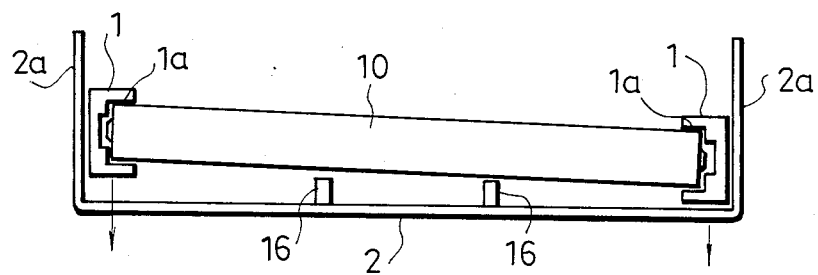
FIG. 11 is a front view of a cassette in a retained state, which is employed to describe a problem experienced with the prior art.

As has been described, according to the present invention, a pair of cassett holders are lowered by means of forces which are applied thereto independently of each other through a driving link and a forced-bias member, respectively. Therefore, the lateral edge portions of a cassette are individually subjected to two different kinds of force and therefore reliably pushed down to the surface of the chassis. Accordingly, even if the cassette is warped, it is infallibly loaded in a normal state. In addition, since it becomes unnecessary to adjust the positions of the right and left driving links by means of the screw 19 as in the case of the prior art shown in FIGS. 8 and 9, the assembling and adjusting operations are facilitated. Further, the pair of driving links can be formed in one unit by bending a single plate material as in the case of the illustrated embodiment, so that it is possible to reduce the number of required elements.

Although the present invention has been described through specific terms, it should be noted here that the described embodiments are not necessarily limitative and various changes and modifications may be imparted thereto without departing from the scope of the invention which is limited solely by the appended claims.

What is claimed is:

1. A cassette loading apparatus adapted to receive a cassette inserted in a front side of a chassis of a tape player in a rearward horizontal direction along an insertion path therein, and to move the cassette vertically downward on the chassis to an operative portion of the tape player, comprising:
   a pair of cassette holders spaced apart in a lateral horizontal direction of the chassis in parallel with each other for receiving the cassette inserted in the tape player and guiding it by its lateral edges in a vertically downward direction in the chassis;
   an ejector member provided at a rearward side of the insertion path and adapted to be retracted by contact with the cassette inserted along the insertion path and to be advanced so as to eject the cassette on the insertion path out of said tape player, said ejector member being biased toward a frontward horizontal direction for ejecting the cassette, wherein said ejector member includes a driving piece which is displaced to initiate loading of the cassette when the cassette is inserted and said ejector member is retracted thereby;
   a pair of driving links spaced apart in the lateral horizontal direction and connected to each other in parallel, each of said driving links being connected by a first connecting portion to a corresponding one of said cassette holders on a respective outer lateral side thereof with a given allowance provided between one of said driving links and the corresponding cassette holder;
   a pair of force-bias members each in parallel with a respective one of said driving links and connected by a second connecting portion to the corresponding one of said cassette holders on the respective outer lateral side thereof;
   a pair of biasing members each connected between a part of said chassis and the respective driving link and force-bias member on each outer lateral side of the respective cassette holder for biasing them in tandem to lower the corresponding cassette holder on each outer lateral side thereof in the vertically downward direction, such that the cassette holders are moved downward on the respective sides by two independent biasing forces;
   a lock member connected to said driving piece of said ejector member and moved to retracted and advanced positions in response to the retracting and advancing movement of said ejector member, respectively, said lock member having a retaining portion which engages said driving links when the lock member is in the advanced position to retain said driving links to hold the corresponding cassette holders in an upward unloaded position wherein the cassette can be ejected from the chassis by the biased advancing movement of said ejector member, and which releases said driving links when the cassette is inserted to retract said ejector member and move the lock member to the retracted position, so as to allow said driving links to be biased by the corresponding biasing members to move the corresponding cassette holders vertically downward to a loaded position on the chassis.

2. A cassette loading apparatus according to claim 1, wherein the first connecting portions of said driving links are defined by connecting bores which have different configurations and which respectively receive connecting pins provided on said cassette holders.

3. A cassette loading apparatus according to claim 1, wherein said pair of driving links are formed by bending a single plate material.

4. A cassette loading apparatus according to claim 1, wherein said cassette holders have respective connecting pins extending toward the respective outer lateral sides thereof, said first connecting portions of said driving links are each formed by a connecting bore which receives the connecting pin therein, said bore varying in width from substantially the diameter of the connecting pin on a side in the retained state of the driving link to a greater diameter providing the given allowance around the pin on another side in the released state of the driving link, and said second connecting portions of said forced-bias members are each formed by a slot which receives the connecting pin and has a constant width of substantially the diameter of the connecting pin, whereby each cassette holder is moved vertically downward by the corresponding forced-bias member without any play when the corresponding driving link is released by the movement of said lock member to the retracted position.

* * * * *